March 31, 1931.  W. HERTZBERG  1,798,420
MEANS FOR MAKING BROOMS
Filed June 22, 1926   2 Sheets-Sheet 2
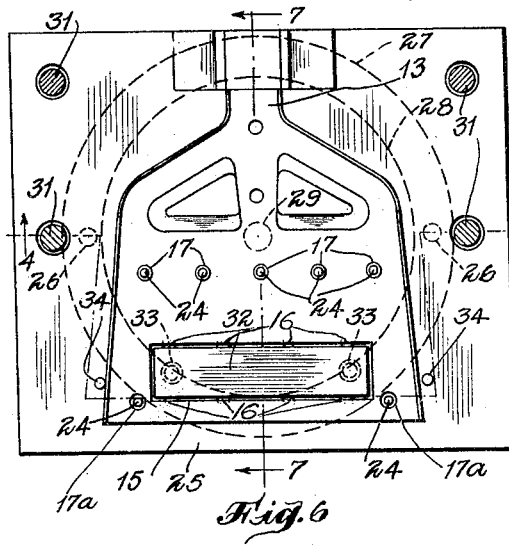
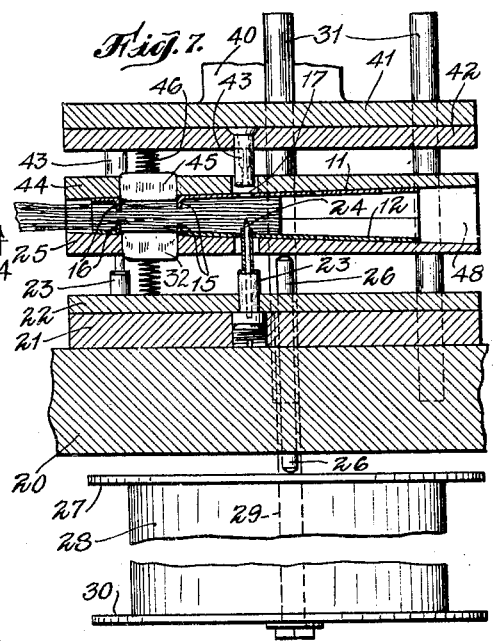
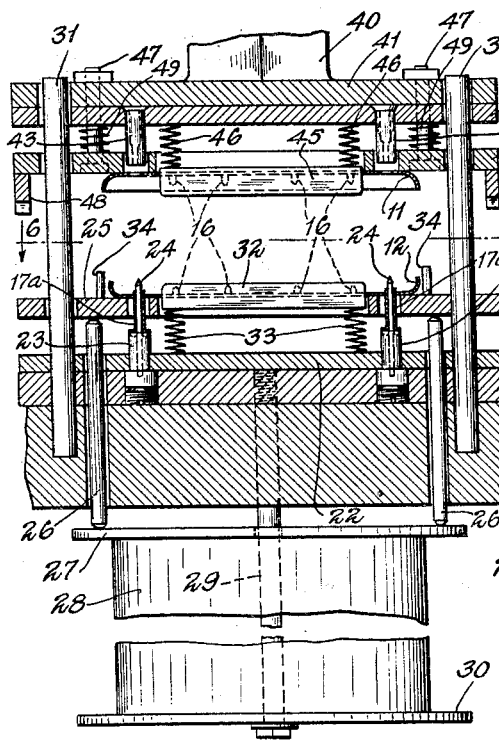
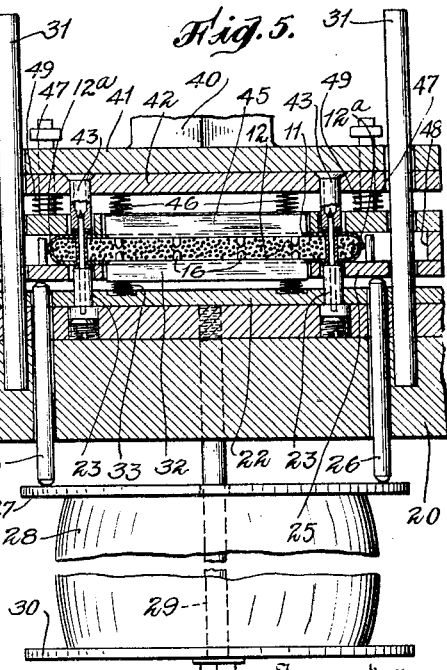
Inventor
WILLIAM HERTZBERG.
By his Attorney
Martin Joachimson Patented Mar. 31, 1931

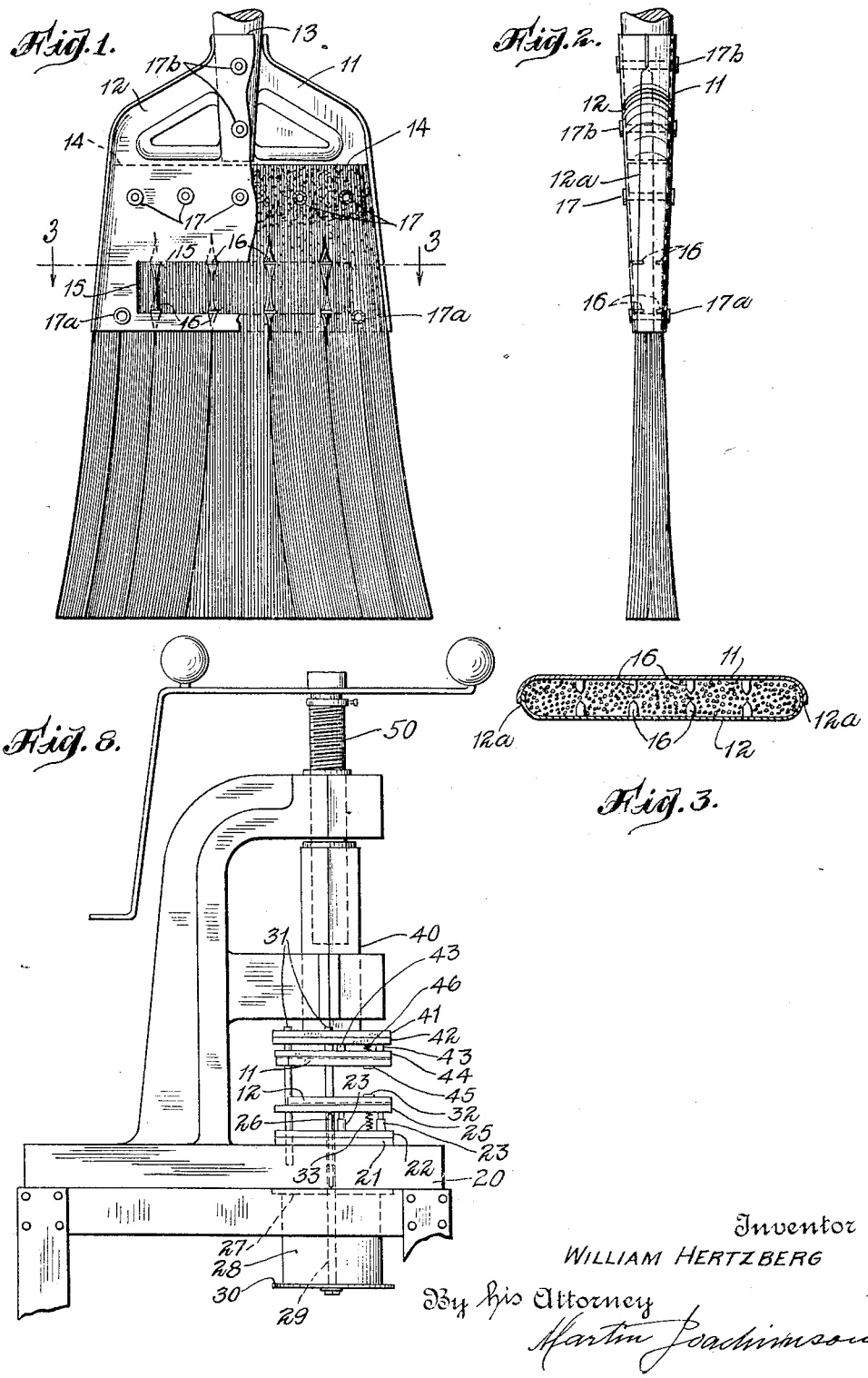

1,798,420

UNITED STATES PATENT OFFICE

WILLIAM HERTZBERG, OF BROOKLYN, NEW YORK

MEANS FOR MAKING BROOMS

Application filed June 22, 1926. Serial No. 117,729.

This invention relates to improvements in the manufacture of brooms and to special means used in the process of manufacturing such brooms.

It is an object of the present invention to eliminate manual labor from the manufacture of brooms to the greatest extent and thereby to reduce the cost of the product.

It is a further object of this invention to produce brooms of more uniform size, weight and strength than manual operations could produce.

With these and other objects in view, the invention consists in a novel machine or compound die for assembling the broom completely in a single operation.

All these features will be hereinafter more fully described and finally pointed out in the appended claims.

In the accompanying drawings, forming a material part of this disclosure:

Fig. 1 is a front elevation of a broom produced by the present invention. The right half of the front cover plate is broken away to show the interior.

Fig. 2 is a side elevation of Fig. 1.

Fig. 3 is a sectional plan on line 3—3 of Fig. 1.

Fig. 4 is a sectional elevation of the broom making apparatus on line 4—4 of Fig. 6— showing the apparatus in opened position.

Fig. 5 is a sectional elevation also on line 4—4 of Fig. 6 showing the apparatus in compressed position.

Fig. 6 is a sectional plan on line 6—6 of Fig. 4.

Fig. 7 is a sectional elevation on line 7—7 of Fig. 6.

Fig. 8 is a side elevation of a screw and plunger press equipped with my broom making apparatus.

Referring to Figures 1 to 3 of the drawings which illustrate the broom, the product of manufacture of this invention, 11 and 12 are two shells. They are preferably of sheet steel and stamped into the form shown. Shell 11 overlaps shell 12 at its outer edges 12a. The neck opening 13 adapted to hold a broom stick, is formed by the upper ends of the shells which have a semicylindrical shape at that place.

The broom material which is preferably piassava or Bahia fiber, rice straw or the like, is clamped between the two shells and extends upwards to the transverse line 14—14 above which deep indentations are formed in the shell-faces to limit the upper end of the broom material. Both shells are provided with rectangular openings 15 near their lower end. The horizontal edges of each shell-plate at these openings are provided with inwardly bent teeth 16, spaced apart and opposite each other, transversely in horizontal direction on either shell and vertically on the same shell. These teeth are so long that they almost touch each other and that they separate the broom straw on vertical planes.

The broom straw-reeds are cemented together and clamped in place by means of tubular rivets or eyelets 17, 17a and 17b of which five marked 17 form a single horizontal row and two marked 17a are near the lower corners of the shells. The rivets 17b are preferably inserted after the broom is completed as they only hold the broom-stick.

By the present invention the above described broom is completely assembled in a single mechanical operation by means of an assembling device which is shown in Figures 4—5—6 and 7 of the drawings and which comprises the upper die fastened to the upper platen 41 which forms a part of the plunger 40 of the press and the lower die which rests on the bolster or lower platen 20 of the plunger or screw press as shown in Fig. 8. In Figs. 4 and 5, 20 is the bolster or platen of a plunger-press on which rests the die base plate 21. Upon the upper face of this plate a third stationary plate 22 is suitably fastened. Plates 21 and 22 hold seven pin sockets 23, each of which holds a pointed hard steel pin 24 in the places shown on Fig. 6 corresponding to the location of the seven eyelets 17 and 17a in the broom shells 11 and 12. A short distance above plate 22 and parallel thereto the operating plate 25 is movably mounted upon pins 26 which are guided in aligned apertures of platens 20, 21 and 22 and which rest on a vertically movable flat plate 27 arranged below the platen 20. Plate 27 covers a rubber buffer 28 which is suspended from the platen 20 by means of a central rod 29 holding a bottom plate 30. Plate 25 is guided vertically by the posts 31 which extend through plates 22 and 21 having their lower ends imbedded in platen 20. There are seven cylindrical apertures provided in plate 25 through which the pin sockets 23 may pass and one rectangular aperture corresponding in location to the rectangular aperture 15 in broom shells 11 and 12. In this rectangular aperture a steel pad 32 is guided which rests on helical springs 33 and is pressed upward by these so that its top surface is slightly above the top face of plate 25. By this arrangement the operating plate 25 is adapted to hold a broom shell 12 in the position indicated in Figs. 4 and 6. When eyelets 17 are placed upon pins 24 their heads will rest upon the top faces of pin-sockets 23 and their upper ends be above the top face of plate 25, while the points of pins 24 protrude above the upper ends of the eyelets. The broom shells 11 and 12 are preferably punched and formed in separate dies not forming a part of this invention. When a shell 12 is placed upon operating plate 25 the pad 32 enters the rectangular opening 15 therein and the teeth 16, being slightly resilient, clamp the shell to this pad by friction against its sides. The ends of the eyelets 17 penetrate through apertures cut in the shell and the points of pins 24 protrude out of the eyelets. Plate 25 carries also two guide pins 34 spaced a small distance from each side of shell 12.

The upper part of the assembling apparatus is held on the plunger 40 of the forming press; this plunger carries at its lower end a plate 41 to which the plate 42 is fastened. This die base plate is similar in construction to plate 22. It carries tubular sockets 43 in vertical alinement with the seven eyelet pins 24 and when lowered they permit these pins to enter into their tubular part. Below plate 42 the upper operating plate 44 is suspended by means of studs 47 guided in plates 41 and 42; similar in construction to plate 25. It is provided with apertures through which the tubular sockets 43 may slide and with a rectangular aperture slidably holding a rectangular pad 45 in vertical alinement with pad 32 of the stationary operating plate 25. Pad 45 is held by means of helical springs 46 in such position that its lower face protrudes a distance below the bottom of plate 44. This pad is adapted to hold a broom shell 11 by the friction of the teeth 16 against the sides of the pad. The right and left ends of plate 44 carry distance pieces 48 which hold this plate a spaced distance from plate 25 when the plunger 40 and upper assembling apparatus is lowered. Plate 44 is held separated from plate 42 by helical springs 49 which preferably surround the studs 47 and which are stronger than springs 46.

The method of making a broom shown by Figs. 1—2—3 by means of the above described assembling machine is as follows:

The operator places a stamped shell 11 upon the pad 45 so that the outer face of the shell rests against plate 44 and teeth 16 hold the shell on the pad. He places seven eyelets 17 upon pins 24 so that their heads rest on the sockets 23 and he then places a shell 12 upon plate 25 in the position shown by Fig. 4. The teeth 16 hold this shell on pad 32. A bundle of broom straw the weight or quantity of which is previously measured, is then dipped into hot asphaltic cement so that the reeds are covered with the cement for about 2 inches from one of their ends. This dipped end of the bundle is laid into shell 12 while in the press. The dipped ends of the reeds extend beyond pad 32 and the row of five pins 24 to the transverse line 14 at the indentation of the shell.

The material is somewhat flattened out to be uniformly distributed on the shell and the press operated by rotating the screw 50 and thereby lowering plunger 40 with the upper part of the assembling die and shell 11. During this descent the pad 45 first touches the broom reeds and levels their upper surface. Increased pressure makes both pads 45 and 32 recede into the apertures of plates 44 and 25 while springs 46 and 33 are being compressed. While the upper shell 11 continues to move downward, its edges are placed around those of the lower shell 12. The outside of the upper shell 11 is guided by pins 34 arranged for this purpose. When the upper shell is in its final position on the lower shell the distance pieces 48 have reached plate 25. This position is illustrated in Fig. 7. Further movement of the plunger moves distance pieces 48 which press this plate 25 downward against the resistance of the rubber buffer 28. The sockets 23 enter into plate 25 and the eyelets 17 penetrate the broom-straw body until their upper ends protrude above shell 11. A further downward movement of plate 42 moves the upper tubular sockets 43 downward in plate 44, the ends of pins 24 enter into apertures of sockets 43 and at the end of the stroke their lower faces rivet the eyelets, forming heads outside of shell 11. During the riveting operation the springs 49 are compressed and studs 47 move slightly upward in plates 42 and 41. This position is illustrated by Fig. 5. By the downward movement the teeth 16 are pressed between the broom material, forming the same into a plurality of separate bundles. The cement surrounding the reeds is pressed into all spaces between them and it also joins the broom material to the shells. The broom is now completely assembled and removed from plate 25 by opening the press whereby all parts return into their initial position. While the description of the broom-making operation may appear complex, the time consumed in its execution occupies only a few seconds. It will be apparent therefore that a considerable amount of work is eliminated by this invention, that brooms produced by this machine are more uniform in structure and appearance than brooms made by hand, that the brooms are stronger and that the cost of making brooms is greatly reduced by the invention.

Having thus described my invention, what I claim as new and desire to secure by Letters Patent is:

1. A machine for making brooms consisting of a press having a pair of platens, an assembling device consisting of two cooperating members between said platens for holding a pair of metallic shells, means on each member yieldingly supporting one of said shells and riveting means rigidly held on each member adapted to rivet said shells to each other.

2. A machine for making brooms comprising means for holding a pair of metallic shells separated from each other in superposed mating relation, a plurality of metallic fastening means held in apertures of one of said shells, means to place said shells in juxtaposition upon each other and to compress broom reeds inserted between them to pass said fastening means through the reeds and through the second shell and means to deform said fastening means to permanently clamp said reeds between said shells forming a broom.

3. In an apparatus of the kind described a stationary lower platen, a movable upper platen, an operating plate movably mounted on each platen in the space between them, a plurality of sockets mounted on the lower platen, a pin adapted to hold an eyelet, on each socket a plurality of tubular sockets mounted on the upper platen in axial alinement with said pins, said sockets being arranged to pass through apertures of the operating plates of the platen to which they are attached, distance pieces on the upper operating plate to limit its movement towards the lower operating plate and resilient means supporting said lower plate, each operating plate being adapted to receive a metallic broom shell and to receive fibrous material in the space between said shells, said sockets and distance pieces forming means to upset said eyelets upon said shells to form a broom of predetermined thickness.

4. A machine for making brooms comprising a press having a pair of platens, means on one of said platens to hold one of a pair of broom shells which are together adapted to hold a quantity of broom material in the space between these shells, an operating plate on the opposite platen to compress the broom material, means to rivet said shells together and means to limit the compression of the broom material.

5. A machine for making a broom comprising a press having a stationary platen and a plunger movable towards said platen and means between said platen and plunger for holding a pair of shells having apertures and being adapted to receive broom material between the shells, an operating plate to compress the broom material, means to hold rivets in the apertures of one of said shells, and means to upset the ends of said rivets, said operating plate and said upsetting means being operated by said plunger during a single movement toward said platen.

6. In a machine for making brooms the combination with a press having a stationary and a movable platen, of means between said platens to hold a pair of shells adapted to receive broom material therebetween, a plate to compress the broom material while in said shells yieldingly held on the movable platen and means to rivet said shells together adapted to move through said compressing plate, said movable platen forming means to operate said compressing plate and said riveting means during its approach towards said stationary platen.

7. A broom making machine comprising a press, a pair of dies in said press, means on said dies to hold by frictional engagement a pair of apertured metallic shells adapted to receive broom material therebetween, pins on one of said dies for passing eyelets through the apertures of both shells and means to upset the ends of said eyelets upon said shells.

8. A broom making machine comprising a press, a pair of platens forming parts of said press, means for holding rivets on one of said platens, riveting anvils in alinement therewith on the other platen, a pair of operating plates arranged between said platens said riveting means passing through apertures of said operating plates, each operating plate being adapted to receive a metallic shell and to receive fibrous material between said shells, said anvils forming means to upset said rivets for joining said shells by the operation of said press.

9. In a machine of the kind described a stationary platen and a movable platen, an operating plate movably mounted on each platen in the space between them, a plurality of sockets mounted on the stationary platen, a pin adapted to hold an eyelet on each socket, a plurality of anvils mounted on the movable platen in axial alinement with said sockets, said anvils and sockets being arranged to pass through apertures of the operating plates, each operating plate being adapted to hold a metallic plate provided with apertures for said eyelets, said anvils and sockets forming means to rivet said eyelets to said metallic plates under pressure of said platens.

10. A machine for making brooms comprising a press, a pair of dies in said press each die including means to hold a metallic shell and adapted to hold broom material therebetween, a buffer operating one of said dies forming means to compress the broom material between the shells, means on one of said dies to pass rivets through the shells and broom material and upsetting means on the other die cooperating with said rivet passing means to deform said rivets and to join said shells permanently to each other.

11. A machine for making brooms comprising a pair of platens which hold a pair of broom shells distant from each other, means for holding rivets perpendicular to the faces of said shells, means to move said shells towards each other to compress broom reeds between said shells and to press said rivets therethrough and through said shells, and rivet upsetting means co-operating with said compressing means during one working stroke.

12. A broom making machine comprising a pair of dies, each die having an end plate for fastening said die to a broom making machine, said dies being adapted to move towards each other, an operating plate movably mounted on each die between said ends plates, means on each end plate resiliently supported thereby for holding a metallic shell adapted to receive broom material, said shells being provided with teeth struck from their material to engage said holding means by friction, and said dies being adapted to separate said shells from said holding means while said dies approach towards each other.

13. A machine for making brooms comprising a press having a pair of platens, means between said platens for holding separated from each other a pair of broom shells provided with apertures, holders for supporting a plurality of fastening members within the apertures of one of said shells, means for moving the shells towards each other to compress broom material between the shells while simultaneously passing said holders with the fastening members thereon through the broom material and the apertures of the second shell and means for upsetting the fastening members upon the second shell, said press being adapted to operate said means for moving a broom shell, for compressing broom material and for upsetting the fastening means during each stroke.

14. A broom making machine comprising a press, a pair of dies in said press for holding a pair of apertured shells between said dies which shells are adapted to confine the ends of broom material therebetween, means on said dies co-operating with each other to compress the broom material between the shells, to rivet the shells together and to fix the thickness of the compressed broom material.

15. A machine for making brooms consisting of a press having a pair of platens, a broom-riveting device between said platens including oppositely movable dies, one thereof being provided with eyelet-supporting pins, the other die being provided with co-operating eyelet sets, a movable plate overlying said eyelet sets and a pair of broom shells between said dies having broom material interposed therebetween, said press providing operating means to compress the material between said shells during one part of its stroke and for upsetting the eyelets on said pins upon said shells during a later part of the same working stroke.

In testimony whereof, I have signed my name to this specification this 18th day of June 1926.

WILLIAM HERTZBERG.